Nov. 18, 1958   B. ABBOTT   2,860,556
CAMERA
Filed July 23, 1953   3 Sheets-Sheet 1
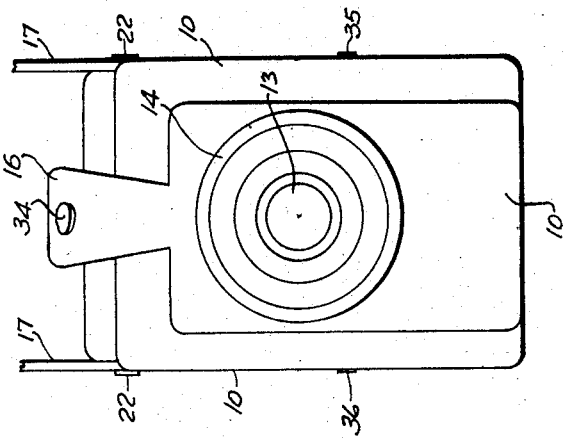
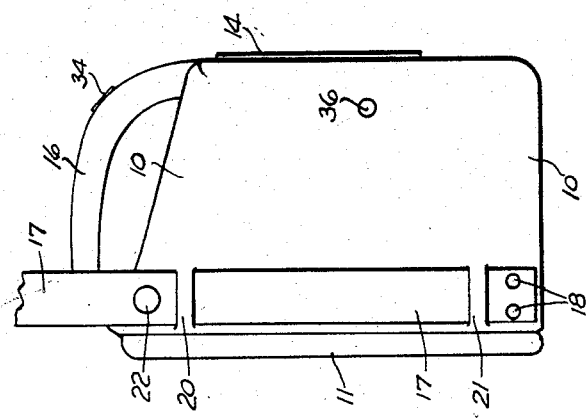
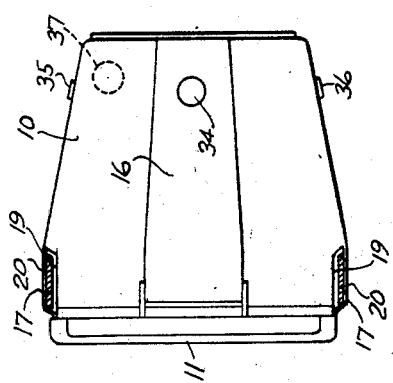
INVENTOR.
*Berenice Abbott*
BY
*Lackenbach & Hirschmann*
ATTORNEYS

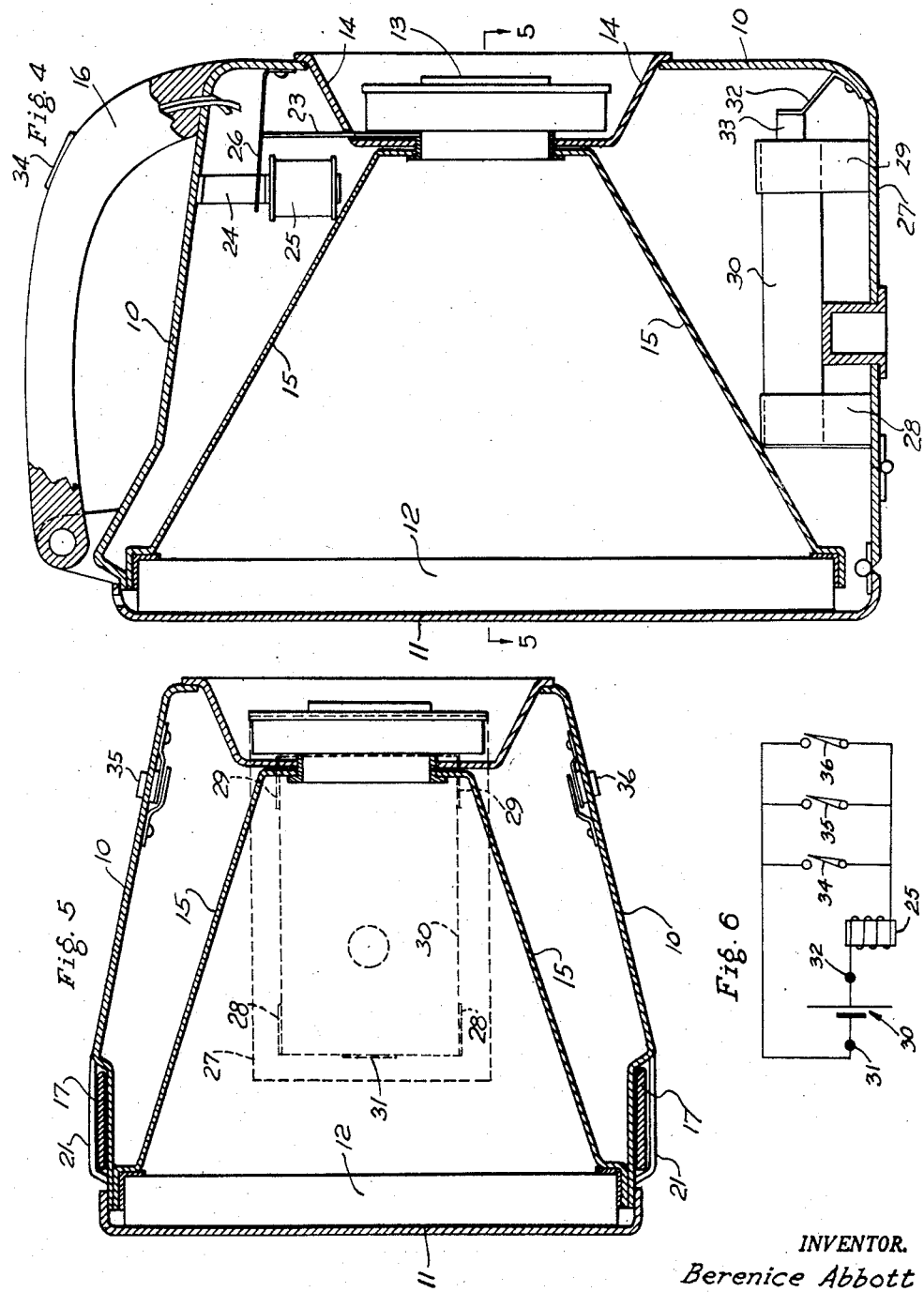

Nov. 18, 1958     B. ABBOTT     2,860,556
CAMERA

Filed July 23, 1953     3 Sheets-Sheet 3

INVENTOR.
Berenice Abbott
BY
Attorney

United States Patent Office 2,860,556
Patented Nov. 18, 1958

2,860,556

CAMERA

Berenice Abbott, New York, N. Y.

Application July 23, 1953, Serial No. 369,812

8 Claims. (Cl. 95—11)

The present invention relates to cameras, and, particularly, to cameras of the "candid" type.

This application is a continuation-in-part of my copending application for patent on "Cameras," bearing Serial Number 44,495, filed in the United States Patent Office August 16, 1948, now abandoned.

In the operation of the several types of candid cameras now on the market considerable time is lost in the sighting and focusing of the camera before the shutter is released; so much so that very frequently the action shot which it was intended to photograph has completely changed or disappeared by the time the camera has been properly adjusted for snapping the picture, so that the picture desired to have been taken is lost. The known candid cameras have been made easily manipulable to speed the taking of a picture by constructing them of small size, and the small size film necessarily employed with such cameras unfortunately contributes to a high incidence of failures of good pictures on a particular roll. The small panel of film presented for exposure of course would tend to decrease the cost of a satisfactory negative; but the difficulties involved in getting the subject matter quickly and desirably on a small area of sensitized material works against the efficiency of candid cameras of the types now generally known. Although previously known candid cameras were intended to enable the photographer to snap on-the-spot scenes, the fact that they cannot accomplish this result except in rare instances remains: the photographer must usually have prefocused the camera and have taken precautions that the image will fall properly upon the fill roll panel ready for exposure. There is little assurance that a good result will be had on a small panel unless delicate sighting has preceded the release of the shutter.

It has been my experience that the known candid cameras have not yet met the need for a camera which will take an instantaneous shot of a changing scene, all the more so as these cameras are usually equipped with range finders, view finders, and other impediments to the instantaneous snapping of an action shot.

It is accordingly the general object of the present invention to provide a camera, which may be termed an "instantaneous candid camera," capable of photographing, without time-consuming focusing and sighting of the apparatus.

More specifically, it is an object of the present invention to provide a practically instantaneous candid camera which is capable of being comfortably held with one hand and of being rapidly aimed at a subject to be photographed with the same hand and of being operated—that is, of having the shutter released—with a finger or the thumb of the same hand, all while the camera is held approximately at hip level, and without the necessity of lifting the camera to chest or eye level, so that a greater degree of concealment is possible and more natural shots are attainable.

A further object of the invention is to provide a camera of the type indicated which is as nearly as possible devoid of adjustable apparatus which must be manipulated before a picture may be taken. However, the present camera is provided with means for swiftly changing the focal distance from a norm of approximately fifteen feet to infinity or a close-up of approximately nine feet. This choice of ranges has been found suitable for all candid shot requirements.

It is also an object of the invention to provide a candid camera the shutter of which may be operated by the thumb or a finger of the hand of the operator, at any of a plurality of different stations of positions on the camera.

A still further object of the invention is to provide candid camera for snapping a changing scene practically instantaneously and provided with a plurality of means whereby the camera may be held, aimed, and operated by one hand, so that the photographer on catching a scene or subject that he wishes to photograph may aim the camera and release the shutter in the matter of less than a second or so; the means for holding the camera being so constructed as to enable a finger or the thumb of the supporting hand to operate mechanism within reach of the digits of the hand to release the shutter.

Another object of the invention is to provide the camera with a rigid handle which may be conveniently gripped between the palm and the four fingers of one hand whereby the thumb of the hand may be utilized as a director for aiming the camera at the subject matter and also for actuating a shutter release or focal adjustment mechanism.

These and other objects, advantages, and features of the invention will be more fully understood from the following description and from the drawing, in which two modifications of the invention are illustrated.

According to the present invention there is provided a camera which can be quickly aimed at a subject to be photographed with one hand and the picture snapped with the same hand by providing focal adjustment and shutter release mechanism within reach of a finger or the thumb of such hand. To this end the camera is provided with holding or carrying means which enable the camera to be raised, turned, or tilted by a twist or bend of the wrist, or, when necessary, to be aimed by the camera-carrying hand without assistance from the other hand. While my improved candid camera is preferably fitted with a wide-angle lens—that is, a lens having an angle of at least 60°, and, better, 80°-85°—a more common lens may be used. Since the films or plates used with my camera are of considerably greater area than the sensitized panels used with known candid cameras it is not so material where the reflected light from the desired subject matter impinges upon the film or plate, for, obviously, the print from the resulting negative may be cut to exclude undesired matter. By the combination of holding means which enable the camera to be quickly raised, turned, or tilted by a twist or bend of the wrist, or, when necessary, to be aimed by one hand, and the correspondingly relatively large sensitized films or plates, I insure that the subject it is desired to photograph will be reproduced upon one or another portion of the film or plate; and, after development, the desired composition can, if necessary or preferred, be cut out of the developed film and enlarged. The invention may be embodied in a camera of the fixed focus type; but herein it will be shown how, by simple means, normal-, infinity-, and close-up-shots may be had substantially simultaneously with actuation of the shutter release mechanism. It is desirable, but not essential, to make the shutter release mechanism controllable from more than one point on the casing of the camera, so that the photographer's free hand may be utilized to actuate such mechanism.

In the drawing:

Figs. 1 through 6 relate to a first embodiment of the invention.

Fig. 1 is a top plan view of this embodiment.

Fig. 2 is a right side elevational view of the same.

Fig. 3 is a front elevational view.

Fig. 4 is a partly sectional view of the embodiment, much enlarged, the plane of the sectional portion of the figure being the fore and aft vertical median plane through the camera.

Fig. 5 is the section 5—5 of Fig. 4, some parts of the camera not being in section for purposes of clarity.

Fig. 6 is a circuit diagram.

Figure 7:
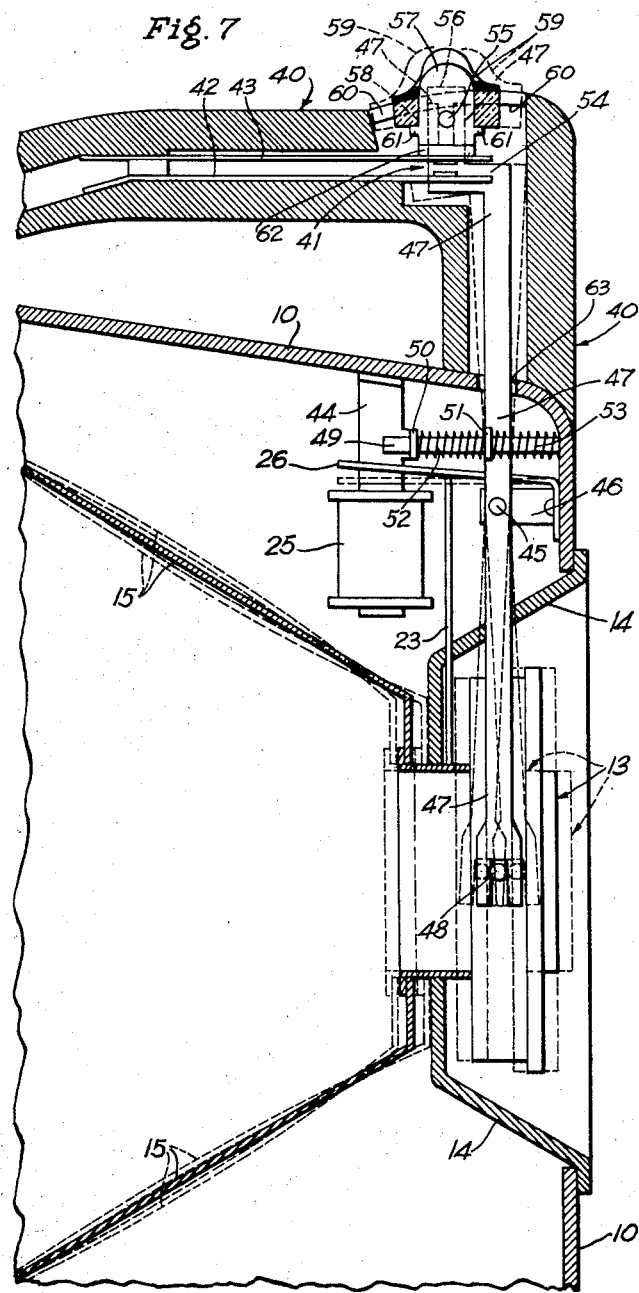

Fig. 7 relates to a second embodiment of the invention, and corresponds generally to Fig. 4. Fig. 7 is partly erased to avoid duplication of matter clearly illustrated in Fig. 4 and which may be common to both embodiments.

The differences between the first and second embodiments are in the structure of the handle by which the camera may be carried and aimed, and in that the second embodiment provides focal adjustment means while the first does not.

The embodiment of the camera illustrated in Figs. 1 through 5 is seen from the outside in Figs. 1, 2, and 3. The camera comprises an outer housing or casing, which may be of any suitable material; but in the embodiment as illustrated the material is assumed to be electrically nonconductive. For example, the material may be a suitable plastic. While the material could, of course, be metallic, certain insulating problems would have to be overcome in the structure shown, and, while the solution of such problems are well known in the electrical arts, additional provisions for electrical insulation would involve an increased manufacturing cost. The camera also comprises a true camera obscura, here assumed to be of rigid construction and functionally equivalent to a bellows extended a particular distance; and the camera obscura is mounted within said housing or casing. The camera further comprises a lens and shutter assembly; a plurality of digitally controllable electromagnetic means for actuating the shutter; and means for holding, aiming, and operating the camera comfortably and accurately with one hand.

The outer housing or casing of the camera is designated in its entirety as 10. In the usual manner the rear of the housing or casing is provided with a hingedly mounted door 11 adapted to hold a film pack or the like in place. The film pack or its roll or its functional equivalent is designated 12. The front of the housing or casing is circularly fenestrated to accommodate the usual lens barrel and shutter mechanism and a support therefor. This construction is more readily understood with reference to Fig. 4, in which the assembly of the lens and shutter mechanism is designated 13, and the support—a dished centrally perforate element, preferably of plastic —14. The latter is fitted within the circular fenestration of the outer housing or casing 10 and is suitably secured in place, as by cementing.

The camera obscura is designated 15, and, since, in the presently described embodiment of the invention, the camera obscura is not required to change shape like a bellows, it may be a rigid structure of light sheet metal or of plastic, or other material and firmly attached to the rear of the barrel of the lens. It is particularly desirable that the true camera obscura be so constructed that it provides a light seal independently of the outer housing or casing 10 for the reason that one or more parts of the latter may therefore be more conveniently made if the aggregate structure is not required to provide an absolute light seal. The outer housing or casing serves mainly as a protective and reinforcing covering for the true camera obscura, and is not necessarily part of the dark chamber itself. Thus the housing or casing may conveniently be provided with one or more doors, or the equivalent, by means of which access may be had to the interior of the housing or casing without disturbing or admitting light to the true camera obscura.

The camera is provided with a rigid handle 16, the latter being rigidly attached to the outer housing or casing 10. The shape and general construction of the handle 16 as shown in Figs. 1 through 4 have been found to be satisfactory; but it will be obvious that variations as to shape and construction may be had within the scope of the invention. It is essential, however, that the handle 16 be rigid and that it be rigidly attached to the outer housing or casing of the camera, as the handle is employed not only for carrying but also for aiming the camera. The handle 16, as indicated in Figs. 1 through 4, is dissected by the fore and aft vertical median plane of the camera; and the handle is shown, best in Fig. 4, to be of a shape which is suited to the hand of the photographer so that his fingers may comfortably engage the under side of the handle, leaving his thumb free to engage the upper side and to operate a focusing and shutter actuating device mounted thereon. This device and the handle itself are subsequently described in detail.

The camera is also provided with a shoulder or other strap 17, the ends of which are riveted or otherwise secured to the rear lower side portions of the camera at 18. Toward the rear of the outer housing or casing 10 the side walls are cut and formed, providing a depressed portion 19 and two shackles 20 and 21 (see Fig. 2, particularly). The strap 17 is passed beneath shackles 20 and 21 on both sides of the camera (see Figs. 1, 2, and 5).

The photographer's hand may be passed between the strap 17 and either side of the camera. Therefore, the camera may be conveniently held with but one hand in three different ways: by the handle 16; with the right hand passed between strap 17 and the right side of the camera; and with the left hand passed between strap 17 and the left side of the camera. Mounted on strap 17 on both the right and left sides of the camera are detents 22 which operate to limit the amount of slack available in strap 17 between shackles 20 and 21, the detents engaging shackle 20 when the hand of the photographer sufficiently belies the strap 17.

The embodiment of the invention being presently described is provided with a plurality of means for actuating the shutter. This embodiment is a candid camera which may be held, aimed, and operated with one hand, so that photographs of unexpected subjects may be taken with no greater delay than that approximately required in pointing the hand. Thus means for operating the shutter mechanism of the embodiment are positioned convenient to a finger or thumb of the hand supporting the camera. For example, a means for actuating the shutter is provided on the fore part of the handle 16 whereby the thumb of the hand which is holding and aiming the camera may conveniently be utilized to snap the picture; and, also, other means for actuating the shutter are provided on the fore parts of the sides of the housing or casing, such means being adapted for finger control, as by a finger of a photographer's hand inserted between a portion of strap 17 and a side of the housing. It will be understood that other means for actuating the shutter might well be provided. However, a particular feature of the invention is that any such means may be operated by a finger or the thumb of the hand which is supporting and aiming the camera whereby the snapping of the picture may immediately follow an aiming operation while the composition sought to be photographed still exists—it being assumed, of course, that the greatest advantage offered by the invention, and desired by the photographer, is the readiness with which an action shot may be made.

Herein it is assumed that the shutter mechanism, detailed structure of which is well known and therefore not illustrated, is actuated in response to the advance of a triggering element, such as the rod 23 shown in Fig. 4.

It has been found convenient in cameras of the type described herein to provide electromagnetic means for actuating the shutter since such means may be located at different stations of position without involvement of complex mechanical structures. Where three stations are selected for shutter actuating devices, as in the present embodiment, each device comprises a switch; and all switches are wired in parallel whereby the closing of any single switch effects operation of electromagnetic means incorporated in the circuit. Thus, mounted on a bracket 24, rigidly connected to the upper part of the housing or casing 10, is an electromagnet 25, which is adapted to actuate a spring-controlled armature 26. As armature 26 is attracted to the magnet the rod 23, which controls the shutter, is advanced (here, moved downwardly, as of the drawing), said armature engaging the rod (see Fig. 4, wherein the armature and rod are shown in normal or nonoperative positions).

It has been suggested earlier that a preferred material for the outer housing or casing of the camera is one which is electrically nonconductive; and, in the drawing, such a material is assumed to have been selected. In Fig. 5 two push-button type switches are shown, these being so mounted, on the right and left sides of the housing or casing, that their conductor elements are in actual contact with the material of the housing, which material serves as an insulator. See below.

A door 27 is provided on the bottom of the outer housing or casing of the camera, the door being hingedly mounted at 27a (Fig. 4; also Fig. 5). On the inner side of door 27 a pair of clips 28 and 29 are provided for holding a battery 30. Contactors 31 and 32 are provided for engaging the poles of the battery under tension. The battery is assumed to be one of the newer types of dry cell, and the positive pole 33 is engaged by contactor 32; the negative pole, i. e., any portion of the (zinc) casing, as, for example, the base thereof, is engaged by contactor 31. Fig. 6 is a circuit diagram showing magnet 25 in series with battery 30 and with any one of three switches 34, 35, and 36, the switches being in parallel with respect to each other, whereby the closing of any one switch effects energization of the magnet 25. Switch 34, details of which are not shown, is positioned within the fore part of handle 16. Switch 35 is on the left fore part of the camera, while switch 36 is on the right fore part thereof. The reference numerals 34, 35, and 36 are general designations of entire switch structures. Switch 35, which is substantially like switch 36, comprises a push button, and two contactors, secured to the side wall of the outer housing or casing of the camera. That contactor shown in the drawing to be engaged directly by the push button is a leaf spring; accordingly the switch is normally open. Similarly switches 34 and 36 are normally open.

Since actuation of the shutter requires only energization of the electromagnet 25, exposure may be had by operation of any one of the three switches. Switch 34 is particularly well suited for operation by the thumb of the hand holding the camera by handle 16. Switches 35 and 36 may be conveniently operated respectively by a finger of the left and right hand when the latter is introduced between strap 17 and a side of the camera housing.

Thus the photographer may carry the camera gripped in either hand by means of the rigidly mounted handle 16, and with the fingers of the hand engaging the under part of the handle and leaving the thumb free for operation of switch 34, the push button or similar part of which is presented upwardly through the top fore part of the handle. See Fig. 4. Also, where the photographer is supporting the camera with either hand between a side of the camera and strap 17, one of his extended fingers may quickly operate one of the switches 35 and 36.

Additional means for utilization of the battery to energize a flash lamp may, of course, be provided. In Fig. 1, for example, the dotted circle designated 37 indicates an optional flash lamp socket.

The embodiment described above provides no means for changing the focal distance, i. e., for focusing the camera.

The first embodiment of the invention may be modified, as illustrated in Fig. 7 and described hereunder, to form a second embodiment which incorporates all the features of the first, and, in addition, the feature of adjustability of the focal length.

It has been earlier pointed out that a normal focal distance of approximately fifteen feet with two variations therefrom, one for distance and the other for approximately nine feet, provides a choice of ranges found suitable for all candid shot requirements. Thus the camera, in the present embodiment, is normally set for a focal distance of approximately fifteen feet. The focal distance may readily be changed to near infinity or to approximately nine feet; however, upon release of the focal adjustment means, described below, the camera is automatically reset for the normal focal distance.

The feature of means for changing the focal distance, included in the present embodiment, require certain modifications of the general structure shown in Figs. 1 through 5, and these modifications are clearly shown in Fig. 7. The construction of the handle in the second embodiment is different from that of the handle 16 described above, but both handles have the same position with respect to the camera, and both handle are used in the same manner for carrying and aiming the camera. With the exception of the appearance of the handle and parts mounted thereon, Figs. 1 through 5 may be regarded as generally illustrative of both embodiments; and, accordingly, only Fig. 7, which corresponds to Fig. 4, and which, in the main, relates to the modifications, is additionally necessary for a full understanding of the second embodiment. Parts which are alike in both embodiments are designated by like reference numerals.

The rear and lower portions of the camera are erased in Fig. 7. The modified handle is generally designated 40. The handle 40 is rigid and is also rigidly attached to the outer housing or casing 10. The handle 40 is shown to be hollowed, and, of course, may be of composite construction. Mounted within the handle 40 is a switch 41, which is functionally equivalent to switch 34. Switch 41 comprises a rigid contactor 42 and a cooperating contactor 43 which is of resilient material, such as phosphor bronze, and which is normally urged away from contactor 42 as shown in Fig. 7. When the switch 41 is closed, as by depression of contactor 43, the magnet 25 is energized and the shutter is operated as described above. It will be noted in Fig. 7 that the bracket on which the magnet 25 is mounted is slightly different from bracket 24 shown in Fig. 4. Accordingly the bracket in Fig. 7 is designated 44.

Pivotally mounted at 45 on a bracket 46 which is secured to the inside of the housing or casing 10 of the camera is a lever 47. Extending from one side of the lens and shutter mechanism 13 is a pin 48. The lower end of lever 47 is forked and straddles the pin 48, as clearly shown in Fig. 7. As the lever 47 is oscillated the lens and shutter mechanism is moved back and forth as indicated in dotted lines in the figure. A pin 49, rigidly mounted on an ear 50 provided on bracket 44, extends toward the front wall of the housing or casing 10 and passes freely through another ear 51 provided on the lever 47. A compression spring is mounted on the pin 49 on either side of the ear 51. That spring between ear 50 and ear 51 is designated 52; that between ear 51 and the housing or casing 10 is designated 53. The compression springs operate to counter each other and thereby to maintain the lever 47 normally in the position shown in solid lines in Fig. 7. This position is that which results in the lens and shutter mechanism being set for the normal focal distance of approximately fifteen feet. If the lever 47 is oscillated so as to advance the mechanism as far as possible to the right in Fig. 7, the camera is then set for a close-up of approximately nine feet; while if the lever is oscillated so as to retract the mechanism as far as possible to the left, the camera is then set for a focal range of about 26 feet or near infinity. The three possible positions of the lens and shutter mechanism, and of the pin 48 and the forked lower end of lever 47 are indicated in the drawing. The casing for the lens and shutter mechanism can be fixed to the camera obscura, so that adjustment of such casing will cause shortening or lengthening of the camera obscura, the latter being then made of flexible or expandable material (the movement being actually very slight), the deformations of the camera obscura 15 caused by the retraction and advance of the lens and shutter mechanism being indicated in dotted lines in Fig. 7. However, it will generally be preferable to make the camera obscura entirely rigid, and to arrange the lens and shutter mechanism on or in a tubular member which slides, in light-sealing relation, in a sleeve secured to the camera obscura.

Above the pivotal mount at 45 the phantoming of the two off-normal positions of lever 47 and other members associated and movable with it is much simplified, only a few delineating outlines being shown on the drawing. The upper portion of lever 47 is offset at 54, to the left; the upper end of the lever 47, above the offset, is also forked, and straddles a pin 55 passed through a slot 56 provided in a push button 57, the upper end of lever 47 being slidably received in said slot.

The push button 57 is slidably mounted within a slot 58 provided in a member 59, the latter being movable within limits on arcuate guides 60 of the handle 40. Only one of the guides 60 is seen in the sectional view of Fig. 7; another guide is assumed to exist out of the plane of the drawing toward the viewer. Two incomplete phantom outlines indicate extreme positions attainable by member 59. As the member 59 is supported by the guides 60, and keyed thereto in any suitable manner, as by flanges not visible in the drawing, said member may neither move upward or downward with respect to the handle, but may only move in a limited curve, i. e., backward or forward with respect to the handle and to the camera. The member 59 is provided with a fore and aft valley having a rounded bottom, as indicated in the drawing; and the upper portion of the push button 57 extends upwardly through the floor of this valley. The member 59 provides a means whereby the lever 47 (and the push button 57, as well) may be oscillated to change the focal distance of the camera. It is plain in the drawing that both member 59 and the upper part of the push button 57 extend upwardly through a suitable slot or other opening in the handle 40. It will be obvious that the member 59 may be moved in its curved path without actuation of the push button 57 to depress contactor 43 of switch 41; the push button is maintained normally in the position shown in Fig. 7 by contactor 43, which is a spring. The push button is provided with detents 61 which may engage the lower portion of member 59 to limit the upward movement of the push button 57 and also of the contactor 43 following an actuation for closing the switch 41. An ear 62 of push button 57 actually engages contactor 43, such ear being provided so that the stock of the push button is actually offset somewhat with respect to the switch whereby the upper end of the lever 47 may clear the latter, as shown.

Thus it will be understood that the focal distance of the camera may be readily changed by moving member 59 backward or forward with the thumb, and that the shutter may be actuated in the manner previously described by then depressing the push button 57 with the same thumb. Accordingly a rapid focusing and shooting operation may be had with the camera. The lever 47 passes through a slot 63 provided in the housing or casing 10 of the camera, and the rear and forward edges of this slot may serve as detents for limiting the throw of lever 47. It will also be understood from the drawing that upon release of the member 59 and of the pushbutton 57 after an operation moving the lever 47 off its normal position that such position will be regained automatically due to springs 52 and 53. In short, the camera is normally set for a range of fifteen feet; and if a shot is desired at this range it is necessary only to operate the push button.

While I have illustrated an electrically operated mechanism for operating the shutter, it will be clear from the foregoing that other means for operating the shutter can be employed in association with a handle which is rigid and is rigidly attached to the casing of the camera and is shaped to the hand in such manner that the thumb engages the outer surface of the handle and becomes an instrument for pointing the camera at the person, object, or scene to be photographed. Thus, the handle can be made hollow with an air space therein, the outer portion of the handle being rigid, while the inner portion thereof is flexible, so that it can be compressed by the fingers of the closed hand when the handle is gripped with the thumb engaging the outer surface thereof. The air pressure thereby created can be made to push a light plunger which operates the shutter to effect exposure. It will be evident that the handle can be compressed simultaneously with the aiming of the camera with the aid of the thumb. In its general principle, this type of shutter operation resembles the well known bulb and tube release, except that the bulb now constitutes the inner portion of the handle and is shaped to the hand at the underside of the handle. The plunger device can be in the form of a wire-like peg or pin associated with the shutter casing to effect release of the shutter.

If desired, the shifting of the lens and shutter mechanism for changing the focus of the camera can be effected electrically, as by employing two solenoids and two pairs of contacts which are selectively operated when the button 59 is moved forwardly or rearwardly to effect the energizing of one or the other solenoid to cause movement of the tubular casing of the lens and shutter mechanism to the right or left, the armatures of the two solenoids operating upon a common member such as the lever 47 which is held in a predetermined or normal position by the opposed springs 52 and 53.

It will also be evident that the shutter release itself can be effected entirely mechanically as by means of the usual cable release whose operating end is located within reach of the thumb.

It will be understood that while certain advantages will be gained by the use of a wide-angle lens, the invention is not restricted to the use of such lens, and many of the novel features hereinabove described can be incorporated in a camera having an ordinary or normal lens.

I claim:

1. A camera comprising a casing, a wide-angle lens having an angularity of at least 60°, a shutter mechanism at the front of the casing and a film compartment at the rear thereof, a rigid handle secured rigidly and directly to the top of the casing in spaced relation and approximately parallel thereto and overlying the region between the lens mechanism and film compartment, the space between the handle and the top of the casing being substantially only sufficient to enable the fingers to be inserted therethrough, said handle adapted to be held at below waist height, suspended from the crook of the fingers, and with the thumb bearing against the top of the handle, whereby the camera may be securely held below waist height with one hand and instantaneously aimed with the aid of the thumb at such height at a subject to be photographed, and shutter release mechanism at the top of the handle at the forward portion thereof and within reach of the thumb of the same hand, whereby the camera may be aimed and the shutter mechanism released with the thumb without preliminary view or range finding.

2. A camera as defined in claim 1, wherein the camera is provided with a wide-angle lens having an angularity of about 80°–85°.

3. A camera comprising a casing, a camera obscura of fixed dimensions inside said casing and having an opening at the front wall thereof, a wide-angle lens of 80° to 85°, a shutter mechanism at the front of the casing and a film compartment at the rear thereof, said lens being fixedly mounted in the casing to provide a fixed-focus camera, the walls of the camera obscura widening sharply from the lens to the film compartment so that the camera receives a relatively large image of a large field, a rigid handle secured rigidly and directly to the top of and immediately above the casing and approximately parallel thereto and overlying the region between the lens mechanism and the film compartment, the handle being spaced from the casing only sufficiently to enable the fingers to be passed therebetween, said handle adapted to be held at below waist height, suspended from the crook of the fingers, and with the thumb bearing against the top of the handle at the forward portion thereof and close to the lens, whereby the camera may be securely held below waist height with one hand and instantaneously aimed with the aid of the thumb at such height at a subject to be photographed, and shutter release mechanism at the top of the handle at the forward portion thereof and within reach of the thumb of the same hand, whereby the camera may be aimed and the shutter mechanism released with the thumb without preliminary view or range finding.

4. A camera comprising a casing, a camera obscura inside said casing and having a lens and shutter opening at the front wall thereof, a rigid handle secured rigidly and directly to the casing of the camera and extending substantially parallel to but spaced from the adjacent wall of the camera casing to enable the fingers to be inserted between the handle and camera casing, whereby the handle can be firmly gripped within the hand with the thumb upon the outer surface of the handle, so that the camera can be pointed by means of the thumb toward the object or scene to be photographed, and shutter release mechanism so positioned on the handle as to be engaged by the thumb when the latter is in camera-pointing position, so that the camera can be simultaneously pointed and the shutter released by said thumb without preliminary view or range finding.

5. A camera as defined in claim 4, including a support for the lens which is movable relative to the image-receiving end of the camera casing, and a focus-adjusting mechanism positioned on the handle forwardly thereof to be operated by the thumb as the camera is aimed thereby and connected to said lens support.

6. A camera as defined in claim 5, wherein the lens mechanism is adjustable to a single position of shorter focal distance and a single position of greater focal distance than a normal median distance, and means for automatically returning the lens mechanism to the normal position after adjustment to one or the other position.

7. A camera as defined in claim 1, including a support for the lens which is movable relatively to the image-receiving end of the camera casing, and adjustable means disposed forwardly of the handle and connected to said support for varying the focal distance of said camera.

8. A camera as defined in claim 4, including a support for the lens which is movable relative to the image-receiving end of the camera casing, and means disposed on and forwardly of the handle and connected to the lens support for adjusting the lens and thereby the focal distance of the camera, said means comprising a button engageable by the thumb, said shutter release mechanism likewise including a button, said buttons being arranged adjacent to each other for operation by a single continuous movement of the thumb.

References Cited in the file of this patent

UNITED STATES PATENTS

| | | |
|---|---|---|
| 1,706,387 | Kramer | Mar. 19, 1929 |
| 2,138,723 | Bell | Nov. 29, 1938 |
| 2,431,825 | Pollock | Dec. 2, 1947 |
| 2,472,823 | Harlow | June 14, 1949 |

FOREIGN PATENTS

| | | |
|---|---|---|
| 550,600 | Germany | May 12, 1932 |